United States Patent
Barrandon et al.

(10) Patent No.: US 7,846,581 B2
(45) Date of Patent: Dec. 7, 2010

(54) CROSSLINKABLE COMPOSITION FOR A BATTERY ELECTROLYTE

(75) Inventors: Georges Barrandon, Mornant (FR); Catherine George, Saint Genis les Ollieres (FR); Carroll Vergelati, Saint Baudille de la Tour (FR); Yves Giraud, Sainte Foy les Lyon (FR)

(73) Assignee: Rhodia Chimie, Aubervilliers (FR)

( * ) Notice: Subject to any disclaimer, the term of this patent is extended or adjusted under 35 U.S.C. 154(b) by 914 days.

(21) Appl. No.: 10/553,062

(22) PCT Filed: Mar. 23, 2004

(86) PCT No.: PCT/FR2004/000708

§ 371 (c)(1),
(2), (4) Date: Apr. 6, 2007

(87) PCT Pub. No.: WO2004/090037

PCT Pub. Date: Oct. 21, 2004

(65) Prior Publication Data

US 2007/0298320 A1  Dec. 27, 2007

(30) Foreign Application Priority Data

Apr. 3, 2003  (FR) .................................. 03 04153

(51) Int. Cl.
*H01M 6/04*  (2006.01)
(52) U.S. Cl. ........................ 429/189; 429/302; 429/309; 429/313; 252/62.2
(58) Field of Classification Search ............. 429/189, 429/300, 302, 303, 304, 309, 313; 252/62.2
See application file for complete search history.

(56) References Cited

U.S. PATENT DOCUMENTS

| 4,322,518 | A | 3/1982 | Blizzard |
| 5,548,055 | A | 8/1996 | Narang et al. |
| 7,744,772 | B2 * | 6/2010 | Gambut-Garel et al. .... 252/62.2 |
| 2002/0051911 | A1 | 5/2002 | Okada |
| 2004/0197668 | A1 * | 10/2004 | Jung et al. .................. 429/330 |

* cited by examiner

*Primary Examiner*—Jennifer K Michener
*Assistant Examiner*—Carlos Barcena
(74) *Attorney, Agent, or Firm*—Buchanan Ingersoll & Rooney, P.C.

(57) ABSTRACT

The field of the present invention relates to the field of batteries and of polymer electrolytes for batteries and more particularly to the field of lithium batteries.

The invention relates to a composition which can be polymerized and/or crosslinked by dehydrocondensation for a battery electrolyte comprising:
a) at least one organohydropolysiloxane (POS) (A) having, per molecule, at least 2 hydrogen atoms directly bonded to silicon atoms;
b) at least one organohydroxypolysiloxane (POS) (B) having, per molecule, at least 2 —OH groups directly bonded to silicon atoms;
c) an effective amount of a dehydrocondensation catalyst (C); and
d) at least one electrolyte salt (D);
with the condition that the POS (A) and/or the POS (B) comprise(s), per molecule, at least one siloxyl unit comprising at least one group directly bonded to a silicon atom comprising a polyoxyalkylene (Poa) ether functional group.

24 Claims, No Drawings

CROSSLINKABLE COMPOSITION FOR A BATTERY ELECTROLYTE

CROSS-REFERENCE TO RELATED APPLICATIONS

This application is a 35 U.S.C. §371 application of International Application No. PCT/FR2004/000708, filed Mar. 23, 2004, published in French as WO 2004/090037 on Oct. 21, 2004, and claims priority of French Application No. 03/04153, filed Apr. 3, 2003, the disclosures of both applications being incorporated herein in their entirety.

BACKGROUND

1. Field of the Invention

The field of the present invention relates to the field of batteries and of polymer electrolytes for batteries and more particularly to the field of lithium batteries.

More specifically, a subject matter of the present invention is a novel polymerizable and/or crosslinkable composition for a battery electrolyte, a novel polymer electrolyte obtained by polymerization and/or crosslinking of this novel composition, and a novel polymer battery.

2. Description of Related Art

Historically, lead batteries have been the most commonly used. However, there were numerous disadvantages to the lead technology, related to the weight of the batteries, to the unreliability during operation and to the use of a corrosive liquid. This led to the development of alkaline batteries, the electrodes of which were either based on nickel and cadmium (nickel-cadmium batteries), or based on zinc and nickel oxide (zinc-nickel batteries), or based on silver oxide coupled to zinc, cadmium or iron (silver oxide batteries). All these technologies use a potassium hydroxide solution as electrolyte and exhibit the major disadvantage of a low energy density by weight with regard to the requirements related to the development of portable devices. Thus it is that manufacturers have developed a new industry based on lithium batteries using a negative electrode based on lithium metal (hence the name "lithium metal battery"). However, problems related to poor restoration of the negative lithium electrode during successive chargings quickly resulted in a novel type of negative electrode based on carbon, used as insertion compound for lithium (hence the name "lithium ion battery").

The operating principle for lithium batteries is summarized in the following way:

During the electrochemical charging, the transition metal ions of the positive electrode material are oxidized, which results in the deintercalation of the lithium. Electrons are forced to move through the external circuit and a molar equivalent amount of lithium ions passes through the electrolyte, which is an ionic conductor and electronic insulator. This makes possible the intercalation of the lithium at the negative electrode. During the discharge of the battery, that is to say during use, it is the reverse phenomenon which occurs spontaneously.

In batteries, the ionic conductor or electrolyte, which separates the electrodes, is a key component. First, its state, liquid, solid or gelled, affects the safety of the system and, secondly, its conductivity determines the operating temperature range. Liquid electrolytes based on carbonates are commonly used. However, they do not exhibit the optimum safety conditions related to the handling of a corrosive liquid. This is because this type of battery can be the site of episodes, such as a thermal runaway, resulting in the formation of gas, thus increasing the internal pressure of the battery and the risk of explosion. It is for this reason that strict safety standards require manufacturers to use sophisticated cases, thus increasing the cost price of a unit.

In order to overcome this major disadvantage, the battery industry has developed a novel technology based on solid polymer electrolytes comprising a lithium anode, hence the name of "lithium polymer battery"

Due to its solid and nature film-like this novel type of electrolyte makes possible the development of a safer battery which has a great variety of shapes. The thinness of the films formed makes possible an increase in the energy efficiency at a low current density. One of the first "dry polymers" studied was polyoxyethylene for transportation applications. However, one of the disadvantages of this type of polymer is related to a low conductivity for use at ambient temperature and a fortiori at low temperatures. This is thus one of the major disadvantages which becomes critical for use of these batteries under extreme conditions, such as, for example, for geostationary satellite batteries operating in space.

SUMMARY OF THE INVENTION

The experts concerned have thus attempted to develop novel polymer electrolytes. By way of illustration, international application WO 2000/25323 discloses a composition which can be crosslinked to form a battery polymer electrolyte comprising a polysiloxane composed of polyoxyethylene groups or of cyclic carbonate groups having at least two reactive SiH groups, a crosslinking agent having at least two reactive groups of alkenyl type, a hydrosilylation catalyst and an electrolyte salt. This composition is crosslinked thermally by heating between 70 and 100° C. for a time of approximately 6 hours in order to obtain an electrolyte polymer. The major disadvantages of this type of preparation are related to the high cost price of the starting materials, in particular in the case of vinylated oils in combination with oils comprising SiH functional groups, which is a curb on an industrial application.

The industries of the technical field under consideration are thus waiting for novel compositions for a battery electrolyte which make it possible to obtain electrolyte polymers having sufficient levels of conductivity within a suitable temperature range extending from −20° to +80° C. and polymer electrolytes using starting materials with the lowest possible cost price.

DETAILED DESCRIPTION OF THE INVENTION

The main object of the present invention is thus to provide a novel polymerizable and/or crosslinkable composition for a battery polymer electrolyte which makes it possible to obtain electrolyte polymers having sufficient levels of conductivity for use within a suitable temperature range extending from −20° to +80° C.

Another object of the present invention is to provide novel polymerizable and/or crosslinkable compositions for a battery polymer electrolyte, the components of which are starting materials with the lowest possible cost price, as it happens with lower cost prices than the compositions of the prior art using compositions based on vinylated oils in combination with oils comprising SiH functional groups.

The invention is also targeted at the production of a solid polymer electrolyte by polymerization and/or crosslinking of the composition according to the invention.

Another aim of the invention is to provide a polymer battery and more particularly a lithium polymer battery.

These objects, among others, are achieved by the present invention, which relates to a composition which can be polymerized and/or crosslinked by dehydrocondensation for a battery electrolyte comprising:

a) at least one organohydropolysiloxane (POS) (A) having, per molecule, at least 2 hydrogen atoms directly bonded to silicon atoms;

b) at least one organohydroxypolysiloxane (POS) (B) having, per molecule, at least 2 —OH groups directly bonded to silicon atoms;

c) an effective amount of at least one dehydrocondensation catalyst (C); and d) at least one electrolyte salt (D);

with the additional condition that the POS (A) and/or the POS (B) comprise(s), per molecule, at least one siloxyl unit comprising at least one group directly bonded to a silicon atom comprising a polyoxyalkylene (Poa) ether functional group.

According to a first alternative form, the invention relates to a composition which can be polymerized and/or crosslinked by dehydrocondensation for a battery electrolyte comprising:

a) at least one organohydropolysiloxane (POS) (A) having, per molecule, at least 2 hydrogen atoms directly bonded to silicon atoms and at least one group directly bonded to a silicon atom comprising a polyoxyalkylene (Poa) ether functional group;

b) at least one organohydroxypolysiloxane (POS) (B) having, per molecule, at least 2 —OH groups directly bonded to silicon atoms, c) an effective amount of at least one dehydrocondensation catalyst (C); and d) at least one electrolyte salt (D).

The expression "composition which can be polymerized and/or crosslinked by dehydrocondensation" means that the composition according to the invention has an ability to polymerize and/or crosslink by dehydrocondensation reaction. The relevant reactive units of the composition are, on the one hand, polyorganosiloxanes (or POSs) comprising SiH units and, on the other hand, POSs comprising SiOH units. The dehydrocondensation between these silicone reactive units results in the formation of bonds, resulting in the formation of networks and in the release of hydrogen gas.

Preferably, the polyoxyalkylene (Poa) ether functional group of the POS (A) is of polyoxyethylene ether and/or polyoxypropylene ether type.

More particularly, the POS (A) is an essentially linear random or block copolymer of following mean general formula (I):

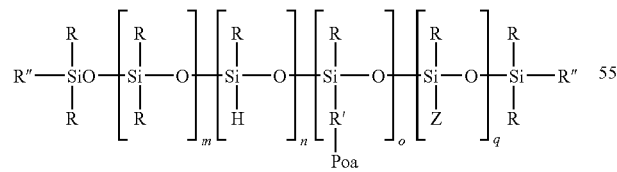

which can optionally comprise units of formula $RSiO_{3/2}$ (T) (the maximum % of T units will be determined so that the composition remains in a liquid form), in which formula:

the R' symbols, which are identical to or different from one another, each represent a radical comprising from 2 to 50 carbon atoms;

the R and R" symbols, which are identical to or different from one another, each represent:

a hydrogen or a linear or branched alkyl radical comprising 1 to 8 carbon atoms which is optionally substituted by at least one halogen, preferably fluorine, the alkyl radicals preferably being methyl, ethyl, propyl, octyl and 3,3,3-trifluoropropyl, an optionally substituted cycloalkyl radical comprising between 5 and 8 cyclic carbon atoms, an optionally substituted aryl radical comprising between 6 and 12 carbon atoms, or an aralkyl radical having an alkyl part comprising between 5 and 14 carbon atoms and an aryl part comprising between 6 and 12 carbon atoms which is optionally substituted on the aryl part by halogens, alkyls and/or alkoxyls comprising 1 to 3 carbon atoms, the Z symbols, which are identical to or different from one another, each represent a hydroxyl or alkoxyl radical, the Poa symbols, which are identical to or different from one another, each represent groups of polyoxyalkylene ether type, preferably of polyoxyethylene and/or polyoxypropylene ether type;

m is an integer or fractional number greater than or equal to 0;

n is an integer or fractional number greater than or equal to 2 and can optionally be equal to 0, with the condition that, when n is equal to 0, then the two R" groups are hydrogen atoms;

o is an integer or fractional number greater than or equal to 1, and q is an integer or fractional number greater than or equal to 0.

Preferably, m and n are between 2 and 200, o is between 1 and 50 and q is between 0 and 10.

In particular, the polyoxyalkylene ether groups (—R'-Poa) are chosen from the following groups:

—$(CH_2)_3$—O—$(CH_2CH_2$—O$)_m$—$CH_3$; —$(CH_2)_2$—O—$(CH_2CH_2$—O$)_m$—$CH_3$;

—$(CH_2)_3$—O—$(CH(CH_3)$—$CH_2$—O$)_m$—$CH_3$ and —$(CH_2)_2$—O—$(CH(CH_3)$—$CH_2$—O$)_m$—$CH_3$, with $m \leq 14$ and preferably between 6 and 12.

According to a specific form, the POS (B) is an essentially linear random or block copolymer of following mean general formula (II):

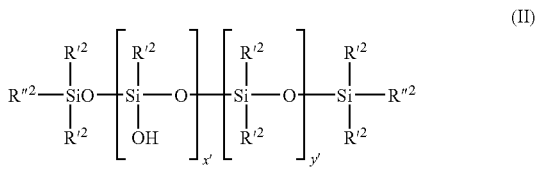

which can optionally comprise units of formula $RSiO_{3/2}$ (T), in which formula:

x' is an integer or fractional number greater than or equal to 2 which can optionally be equal to 0, preferably between 2 and 200 and more preferably still between 2 and 50;

y' is an integer or fractional number varying between 0 and 200, preferably between 1 and 200 and more preferably still between 1 and 50;

the $R'^2$ and $R''^2$ symbols, which are identical to or different from one another, each represent:

a linear or branched alkyl radical comprising 1 to 8 carbon atoms which is optionally substituted by at least one halogen, preferably fluorine, the alkyl radicals preferably being methyl, ethyl, propyl, octyl and 3,3,3-trifluoropropyl, an optionally substituted cycloalkyl radical comprising between 5 and 8 cyclic carbon atoms, an optionally substituted aryl radical comprising between 6 and 12 carbon atoms, and/or an aralkyl radical having an alkyl part comprising between 5 and 14 carbon atoms and an aryl part comprising between 6 and 12 carbon atoms which is optionally substituted on an aryl part, with the condition that, when x'=0, then the two R"² groups correspond to —OH.

Preferably, at least 80% by number of the $R'^2$ groups are methyl groups bonded directly to silicon atoms. In the context of the present invention, it is more especially preferable to use POSs (B) of α,ω-bis(hydroxy)polydimethylsiloxane type of following mean general formula (III):

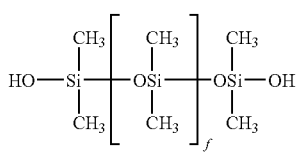

(III)

with f greater than or equal to 0, preferably 0≦f≦200 and preferably 0≦f≦10.

The term "effective amount of at least one dehydrocondensation catalyst (C)" is understood to mean, within the meaning of the invention, the amount sufficient to initiate the polymerization or crosslinking. This amount should be as small as possible in order to make possible better storage over time of the composition. Concentrations of use in catalysis lie between $1 \times 10^{-6}$ and 5, preferably between $1 \times 10^{-6}$ and $1 \times 10^{-2}$, parts by weight of organosiloxane polymer, on a dry basis, to be reacted.

Any catalyst capable of initiating a dehydrocondensation reaction may be suitable. For example, use may be made of a rhodium complex $(RhCl_3[(C_8H_{17})_2S]_3)$ cited in U.S. Pat. No. 4,262,107, a platinum complex, such as the Karstedt catalyst, or metal catalysts based on platinum, rhodium, palladium, plutonium or iridium. Mention may be made, as indium-based catalyst, of the following compounds:

$IrCl(CO)(TPP)_2$, $Ir(CO)_2(acac)$, $IrH(Cl)_2(TPP)_3$, $[IrCl(cyclooctene)_2]_2$, $IrI(CO)(TPP)_2$ and $IrH(CO)(TPP)_3$ in which formulae TPP means a triphenylphosphine group and acac an acetylacetonate group.

It is also possible to use alkali, amine, colloidal nickel or dibutyltin dilaurate catalysts (see the work by Noll, "Chemistry and technology of silicones", page 205, Academic Press, 1968, 2nd edition). Other catalysts, such as boron derivatives of tris(pentafluorophenyl)borane type, are disclosed in French patent application FR-A-2 806 930.

Preferably, the dehydrocondensation catalyst (C) is chosen from the group consisting of the following compounds:

dibutyltin dilaurate, the Karstedt catalyst and the iridium catalyst (Vaska's complex) of following formula (IV):

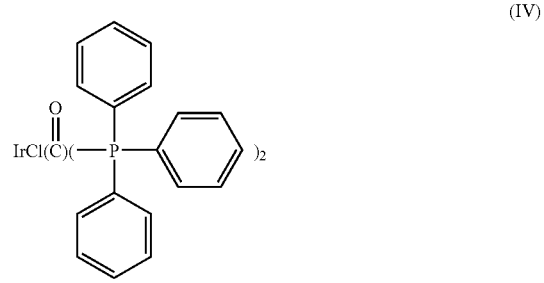

(IV)

According to a specific form of the invention, when the dehydrocondensation catalyst (C) is based on tin or on platinum, the proportions of the POS (A) and of the POS (B) are determined so that the ratio:

$r^1$=number of SiH units of the POS (A)/number of SiOH units of the POS (B) is between 0.5 and 5 and preferably between 0.9 and 2.1.

According to a noteworthy characteristic of the invention, the electrolyte salt (D) is composed:

of a cation chosen from the group consisting of the following entities: metal cations, ammonium ions, amidinium ions and guanidinium ions; and of an anion chosen from the group consisting of the following entities: chloride ions, bromide ions, iodide ions, perchlorate ions, thiocyanate ions, tetrafluoroborate ions, nitrate ions, $AsF_6^-$, $PF_6^-$, stearylsulfonate ions, trifluoromethanesulfonate ions, octylsulfonate ions, dodecylbenzene-sulfonate ions, $R^4SO_3^-$, $(R^4SO_2)(R^5SO_2)N^-$ and $(R^4SO_2)(R^5SO_2)(R^6SO_2)C^-$, in each formula, the $R^4$, $R^5$ and $R^6$ radicals are identical or different and represent electron-withdrawing groups.

Advantageously, the $R^4$, $R^5$ and $R^6$ radicals are chosen from the electron-withdrawing groups of perfluoroaryl or perfluoroalkyl type, the perfluoroalkyl group comprising from 1 to 6 carbon atoms.

According to an alternative form of the invention, the electrolyte salt (D) comprises a metal cation chosen from the alkali metals and alkaline earth metals of Groups 1 and 2 of the Periodic Table [Chem. & Eng. News, vol. 63, No. 5, 26, of Feb. 4, 1985]. In particular, the metal cation is either of lithium type or is chosen from transition metals, for example manganese, iron, cobalt, nickel, copper, zinc, calcium, manganese or silver. The electrolyte salts of lithium type of use according to the invention can be chosen from the group consisting of the following compounds:

$LiClO_4$, $LiBF_4$, $LiPF_6$, $LiAsF_6$, $LiCF_3SO_3$, $LiN(CF_3SO_2)_2$, $LiN(C_2F_6SO_2)_2$ and a mixture of these compounds.

Preferably, the amount of lithium electrolyte salt of the composition is defined so that the O/Li molar ratio is between 15 and 40, preferably between 10 and 30 and more preferably still between 20 and 25.

Although the electrolyte according to the invention is a solid polymer after crosslinking and/or polymerization, the teaching of the invention is not limited to the solid alone. This is because it is possible to add, to the composition, an organic electrolyte (E) in order to obtain, after crosslinking and/or polymerization, a liquid or gelled form. The choice will preferably fall on the compounds chosen from the group consisting of propylene carbonate, ethylene carbonate, diethyl carbonate, dimethyl carbonate, ethyl methyl carbonate, γ-butyrolactone, 1,3-dioxolane, dimethoxyethane, tetrahydrofuran, dimethyl sulfoxide and polyethylene glycol dimethyl ether.

The invention also relates to a polymer electrolyte for a battery obtained by polymerization and/or crosslinking, by the dehydrocondensation route, of the polymerizable and/or crosslinkable composition according to the invention described above. Said dehydrocondensation can optionally be initiated by thermal activation of the catalyst (C). Depending on the type of catalyst used to initiate the reaction, it may be necessary to heat the reaction medium to temperatures of greater than 65° C. Use will preferably be made of temperatures of between 70 and 130° C. The catalyst (C) can be employed as is or in solution in a solvent. The solvents which can be used for the catalysts are very numerous and highly varied and are chosen according to the catalyst used and the other constituents of the composition thus prepared. Generally, solvents can be alcohols, esters, ethers, ketones, water, in the form of trace amounts, and carbonates.

The alcohols commonly employed are para-tolyl-ethanol, isopropylbenzyl alcohol, benzyl alcohol, methanol, ethanol, propanol, isopropanol and butanol. The ethers commonly used are 2-methoxyethanol, 2-ethoxyethanol, diethylene glycol and di(n-butyl)ether. The usual esters are dibutyl maleate, dimethyl ethylmalonate, methyl salicylate, dioctyl adipate, butyl tartrate, ethyl lactate, n-butyl lactate and isopropyl lactate. Other solvents which can be used coming within the other categories of solvents mentioned above are acetonitrile, benzonitrile, acetone, cyclohexanone, toluene and tetrahydrofuran.

The reaction time required varies according to the type of catalyst and the temperature used for the reaction.

The composition according to the invention can also comprise reinforcing agents in order to improve the mechanical properties of the polymer electrolyte obtained after polymerization and/or crosslinking. For example, the composition according to the invention can optionally comprise treated silica, treated alumina or polyorganosiloxane resins.

Another subject matter of the invention is a battery comprising the polymer electrolyte obtained by polymerization and/or crosslinking described above placed between an anode and a cathode. Advantageously, at least one of the constituents of the cathode is chosen from the group consisting of the following entities:

lithium metal, lithium alloys, inorganic materials comprising lithium insertions and carbonate materials comprising lithium insertions.

The application of these batteries is particularly suitable for the following fields of storage of electricity: emergency power supplies for industrial and telecommunication systems, secondary power supplies for portable devices, batteries for geostationary satellite applications and batteries for electric and hybrid vehicles.

The following examples are given by way of illustration and they cannot be regarded as a limit on the scope of the invention.

EXAMPLES

Example 1

Preparation of the Organohydropolysiloxanes Functionalized by Polyoxyethylene Ether Groups POS (A1), POS (A2) and POS (A3)

a) POS (A1)—Reaction Scheme:

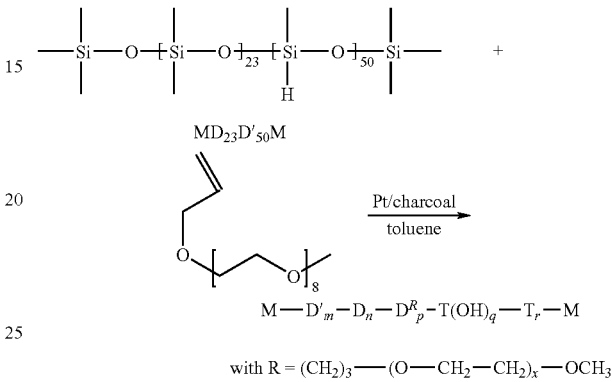

Procedure:

$M=(CH_3)_3SiO_{1/2}$; $D=(CH_3)_2SiO_{2/2}$, $D'=(CH_3)SiH_{2/2}$; $D^R=(CH_3)Si(R)O_{2/2}$; $T(OH)=(CH_3)Si(OH)O_{2/2}$; $T=(CH_3)SiO_{3/2}$; with $R=(CH_2)_3-(O-CH_2-CH_2)_x-OCH_3$.

108.08 g of toluene and 7.00 g of platinum-on-charcoal (i.e., 250 ppm with respect to the reaction mass) are charged to the reactor heel in a 1 l reactor equipped with a stirrer of impeller type, with a reflux condenser, followed by a bubbler and with a baffle (containing the temperature probe). The reaction medium is subsequently brought to 80° C.

The silicone oil $MD_{23}D'_{50}M$ (159 g, i.e. 1.75 mol of SiH) and the allyloxy polyether (309 g, i.e. 0.73 mol) are then run in over 2 hours using a dropping funnel containing the two products and 106.6 g of toluene. This reaction is carried out at approximately 80° C. under a nitrogen head space and with mechanical stirring. The reaction is regarded as complete when the desired degree of conversion of the SiH units (40%) is achieved; the heating and the stirring are then halted. Filtration is subsequently carried out through an aluminum filter equipped with a cellulose membrane covered with diatomaceous earth under nitrogen pressure. After removing the volatile components under reduced pressure (approximately 5 mbar) and at 150° C., an amount of 322.36 g is obtained. The product obtained, POS (A1), has a number-average weight distribution Mn pst=1050 and a weight-average weight distribution Mw pst=5190, and its structure is as follows:

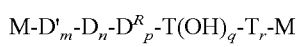

with $R=(CH_2)_3-(O-CH_2-CH_2)_x-OCH_3$

|  | m | n | p | q | r | x | mol % EO grafted |
|---|---|---|---|---|---|---|---|
| POS (A1) | 22.4 | 23.5 | 20 | 2 | 8.8 | 8 | 78 | b) POS (A2)—Reaction Scheme

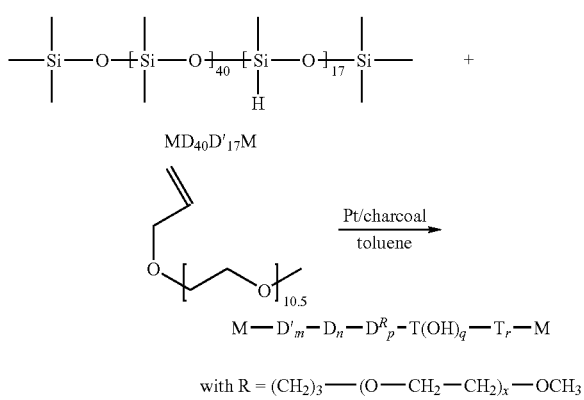

with R = (CH$_2$)$_3$—(O—CH$_2$—CH$_2$)$_x$—OCH$_3$

Procedure 249.9 g of toluene and 2 g of platinum-on-charcoal (i.e., 100 ppm with respect to the reaction mass) are charged to a 1 l reactor equipped with a stirrer of impeller type, with a reflux condenser, followed by a bubbler, and with a baffle (comprising the temperature probe). The reaction medium is subsequently brought to 80° C.

The silicone oil (250.3 g, i.e. 1.03 mol of SiH) and the allyloxy polyether (200.2 g, i.e. 0.37 mol) are then run in simultaneously over 2 hours using a peristaltic pump. This reaction is carried out at approximately 80° C. under a nitrogen head space and with mechanical stirring. The synthesis is regarded as complete when the desired degree of conversion of the SiH units (33%) is achieved; the heating and the stirring are then halted.

Filtration is then carried out through an aluminum filter equipped with a cellulose membrane covered with Primisil under nitrogen pressure. The volatile components are then removed by distillation under reduced pressure (approximately 5 mbar) and at 150° C. A weight of POS (A2), still comprising toluene, of 605.4 g is obtained The distribution of the weight of this product is as follows: Mn pst=4950, Mw pst=11 500 The structure, determined by NMR, is as follows for POS (A2):

M-D'$_m$-D$_n$-D$^R_p$-T(OH)$_q$-T$_r$-M with R=(CH$_2$)$_3$—(O—CH$_2$—CH$_2$)$_x$—OCH$_3$

|  | m | n | p | q | r | x | mol % grafted |
|---|---|---|---|---|---|---|---|
| POS (A2) | 9.7 | 46.6 | 6.1 | 1.4 | 0 | 10.5 | 84 | c) POS (A3)—Reaction Scheme:

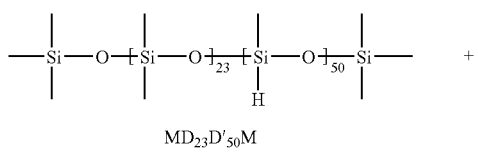

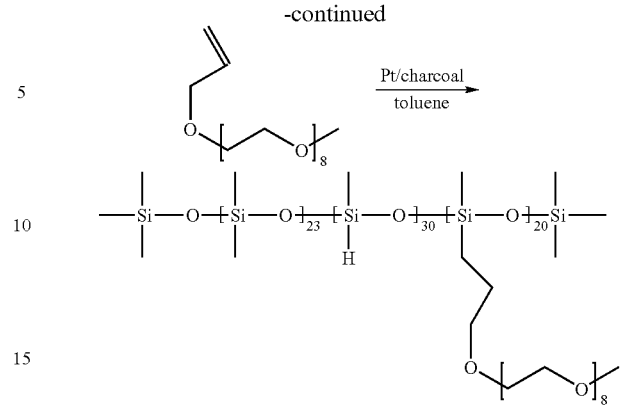

Procedure:

398.2 g of xylene and 6.03 g of platinum-on-charcoal (i.e., 125 ppm with respect to the reaction mass) are added to a 2 l reactor equipped with a stirrer of impeller type, with a reflux condenser, followed by a bubbler, and with a baffle (comprising the temperature probe). The reaction medium is subsequently brought to 80° C.

The silicone oil (287.3 g, i.e. 2.93 mol of SiH) and the allyloxy polyether (502.1 g, i.e. 1.18 mol) are then run in simultaneously over 2 hours using peristaltic pumps. This reaction is carried out at approximately 80° C. under a nitrogen head space and with mechanical stirring.

The reaction is complete when the desired degree of conversion of the SiH units (40%) is achieved; the heating and the stirring are then halted. The product is filtered through an aluminum filter equipped with a cellulose membrane covered with diatomaceous earth under nitrogen pressure. The volatile components are removed by distillation under reduced pressure (approximately 5 mbar) and at 150° C. The amount of product POS (A3) obtained is 665.4 g and the distribution in the weights is as follows:

| Mn pst | 1840 |
|---|---|
| Mw pst | 3670 |

Example 2

Preparation of the Polymer Electrolyte

The oil POS (B1) used in the compositions of the examples is as follows:

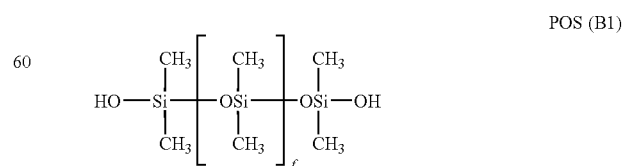

POS (B1)

with f=4.

The compositions according to the invention are prepared by mixing, using a turbine mixer:
a) 10 g of a POS (A) prepared according to example 1,
b) a variable amount of LiTFSi salt (LiTFSI=lithium bis-trifluoromethane-sulfonamide);
c) a variable amount of an oil POS (B1), and
d) 0.1 g of dibutyltin dilaurate.

The mixture is brought to 70° C. and this temperature is maintained for 16 h so as to make possible the crosslinking. After cooling, the polymer electrolyte is recovered in the film form.

The exact amounts of the various components are recorded in the following table 1:

TABLE 1

| Polymer electrolyte prepared from: | Amount (g) of LiTFSi | Amount (g) of POS (B1) |
|---|---|---|
| POS (A1) = Electrolyte E1 | 1.40 | 2.47 |
| POS (A2) = Electrolyte E2 | 1.47 | 3 |
| POS (A3) = Electrolyte E2 | 1.68 | 3 |

Example 3

Measurement of the Ionic Conductivity

The ionic conductivity of the 3 electrolytes E1, E2 and E3 and their changes with temperature were measured via the use of the complex impedance spectrometry technique, which technique makes it possible to determine the characteristic quantities of conductive systems, such as their resistance or their capacity.

The solid electrolyte film is inserted and held fixed between two stainless steel electrodes, the entire combination constituting the main measurement cell. This experimental device is positioned inside an oven which makes possible temperature scanning between −20 and +80° C. The cell is connected to a Hewlett Packard HD4192A impedance meter coupled to a computer for recording the data. The cell is subjected to a sinusoidal voltage of 100 mV crest-to-crest in a frequency range extending from $5 \times 10^{-3}$ Hz to 13 MHz. For each sample, the measurement is carried out after maintaining at the set temperature for ¾ of an hour. Under these conditions, ionic conductivities of the electrolytes E1, E2 and E3 at 25° C., as measured by the complex impedance method, are between $10^4$ and $5 \times 10^{-6}$ siemens/cm.

What is claimed is:

1. A composition which can be polymerized and/or crosslinked by dehydrocondensation for a battery electrolyte comprising:
a) at least one organohydropolysiloxane (POS) (A) having, per molecule, at least 2 hydrogen atoms directly bonded to silicon atoms;
b) at least one organohydroxypolysiloxane (POS) (B) having, per molecule, at least 2-OH groups directly bonded to silicon atoms;
c) an effective amount of at least one dehydrocondensation catalyst (C); and
d) at least one electrolyte salt (D);
with the additional condition that the POS (A) and/or the POS (B) comprise(s), per molecule, at least one siloxyl unit comprising at least one group directly bonded to a silicon atom comprising a polyoxyalkylene (Poa) ether functional group.

2. The composition which can be polymerized and/or crosslinked by dehydrocondensation for a battery electrolyte as claimed in claim 1, comprising:
a) at least one organohydropolysiloxane (POS) (A) having, per molecule, at least 2 hydrogen atoms directly bonded to silicon atoms and at least one group directly bonded to a silicon atom comprising a polyoxyalkylene (Poa) ether functional group;
b) at least one organohydroxypolysiloxane (POS) (B) having, per molecule, at least 2 —OH groups directly bonded to silicon atoms,
c) an effective amount of at least one dehydrocondensation catalyst (C); and d) at least one electrolyte salt (D).

3. The composition which can be polymerized and/or crosslinked by dehydrocondensation for a battery electrolyte as claimed in claim 1, wherein the polyoxyalkylene (Poa) ether functional group of the POS (A) is of polyoxyethylene ether and/or polyoxypropylene ether type.

4. The composition which can be polymerized and/or crosslinked by dehydrocondensation for a battery electrolyte as claimed in claim 1, wherein the POS (A) is an essentially linear random or block copolymer of following mean general formula (I):

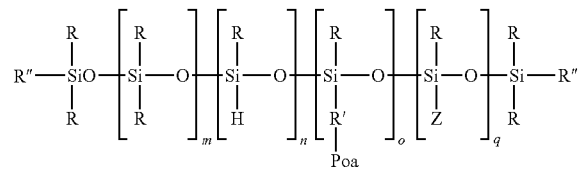

which can optionally comprise units of formula $RSiO_{3/2}$ (T), in which formula:
the R' symbols, which are identical to or different from one another, each represent a radical comprising from 2 to 50 carbon atoms;
the R and R" symbols, which are identical to or different from one another, each represent:
a hydrogen or a linear or branched alkyl radical comprising 1 to 8 carbon atoms which is optionally substituted by at least one halogen,
an optionally substituted cycloalkyl radical comprising between 5 and 8 cyclic carbon atoms,
an optionally substituted aryl radical comprising between 6 and 12 carbon atoms, or
an aralkyl radical having an alkyl part comprising between 5 and 14 carbon atoms and an aryl part comprising between 6 and 12 carbon atoms which is optionally substituted on the aryl part by halogens, alkyls and/or alkoxyls comprising l to 3 carbon atoms,
the Z symbols, which are identical to or different from one another, each represent a hydroxyl or alkoxyl radical,
the Poa symbols, which are identical to or different from one another, each represent groups of polyoxyalkylene ether type;
m is an integer or fractional number greater than or equal to 0;
n is an integer or fractional number greater than or equal to 2 and can optionally be equal to 0, with the condition that, when n is equal to 0, then the two R" groups are hydrogen atoms;
o is an integer or fractional number greater than or equal to 1, and
q is an integer or fractional number greater than or equal to 0.

5. The composition which can be polymerized and/or crosslinked by dehydrocondensation for a battery electrolyte as claimed in claim 4, wherein:
m and n are between 2 and 200;
o is between 1 and 50; and
q is between 0 and 10.

6. The composition which can be polymerized and/or crosslinked by dehydrocondensation for a battery electrolyte as claimed in claim 4, wherein the —R'-Poa groups are chosen from the following groups:
—(CH$_2$)$_3$—O—(CH$_2$CH$_2$—O)$_m$—CH$_3$; —(CH$_2$)$_2$—O—(CH$_2$CH$_2$—O)$_m$—CH$_3$;
—(CH$_2$)$_3$—O—(CH(CH$_3$)—CH$_2$—O)$_m$—CH$_3$ and —(CH$_2$)$_2$—O—(CH(CH$_3$)—CH$_2$—O)$_m$CH$_3$
with m≦14.

7. The composition which can be polymerized and/or crosslinked by dehydrocondensation for a battery electrolyte as claimed in claim 1, wherein the POS (B) is an essentially linear random or block copolymer of following mean general formula (II):

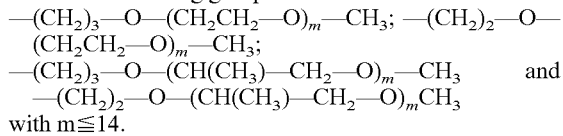

which can optionally comprise units of formula RSiO$_{3\backslash2}$ (T), in which formula:
x' is an integer or fractional number greater than or equal to 2 which can optionally be equal to 0;
y is an integer or fractional number greater than or equal to 0;
the R'$^2$ and R''$^2$ symbols, which are identical to or different from one another, each represent:
a linear or branched alkyl radical comprising 1 to 8 carbon atoms which is optionally substituted by at least one halogen,
an optionally substituted cycloalkyl radical comprising between 5 and 8 cyclic carbon atoms,
an optionally substituted aryl radical comprising between 6 and 12 carbon atoms, and/or
an aralkyl radical having an alkyl part comprising between 5 and 14 carbon atoms and an aryl part comprising between 6 and 12 carbon atoms which is optionally substituted on an aryl part, with the condition that, when x'=0, then the two R''$^2$ groups correspond to —OH.

8. The composition which can be polymerized and/or crosslinked by dehydrocondensation for a battery electrolyte as claimed in claim 1, wherein the POS (B) is an α,ω-bis(hydroxy)polydimethylsiloxane of following mean general formula (III):

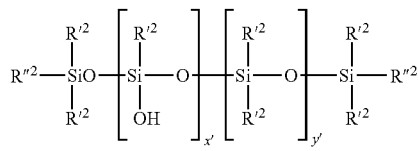

with f greater than or equal to 0.

9. The composition which can be polymerized and/or crosslinked by dehydrocondensation for a battery electrolyte as claimed in claim 1, wherein the dehydrocondensation catalyst (C) is a metal complex or derivative based on platinum, boron, rhodium, palladium, tin or iridium.

10. The composition which can be polymerized and/or crosslinked by dehydrocondensation for a battery electrolyte as claimed in claim 9, wherein, when the dehydrocondensation catalyst (C) is based on tin or on platinum, the proportions of the POS (A) and of the POS (B) are determined so that the ratio r$^1$=number of SiH units of the POS (A)/number of SiOH units of the POS (B) is between 0.5 and 5.

11. The composition which can be polymerized and/or crosslinked by dehydrocondensation for a battery electrolyte as claimed in claim 9, wherein the catalyst (C) is chosen from the group consisting of the following catalysts:
dibutyltin dilaurate, a Karstedt catalyst and the iridium catalyst of following formula (IV):

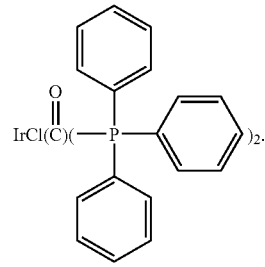

12. The composition which can be polymerized and/or crosslinked by dehydrocondensation for a battery electrolyte as claimed in claim 1, wherein the electrolyte salt (D) comprising:
of a cation chosen from the group consisting of the following entities: metal cations, ammonium ions, amidinium ions and guanidinium ions; and
of an anion chosen from the group consisting of the following entities: chloride ions, bromide ions, iodide ions, perchlorate ions, thiocyanate ions, tetrafluoroborate ions, nitrate ions, AsF6, PF6, stearylsulfonate ions, trifluoromethanesulfonate ions, octylsulfonate ions, dodecylbenzenesulfonate ions, R$^4$SO$_3^-$, (R$^4$SO$_2$)(R$^5$S0$_2$)N$^-$ and (R$^4$SO$_2$)(R$^5$SO$_2$)(R$^6$SO$_2$)C$^-$, in each formula, the R$^4$, R$^5$ and R$^6$ radicals are identical or different and represent electron-withdrawing groups.

13. The composition which can be polymerized and/or crosslinked by dehydrocondensation for a battery electrolyte as claimed in claim 12, wherein the FR$^4$, FR$^5$ and FR$^6$ radicals are electron-withdrawing groups of perfluoroaryl or perfluoroalkyl type, the perfluoroalkyl group comprising from 1 to 6 carbon atoms.

14. The composition which can be polymerized and/or crosslinked by dehydrocondensation for a battery electrolyte as claimed in claim 12, wherein the electrolyte salt (D) comprises a metal cation chosen from the alkali metals and alkaline earth metals of Groups 1 and 2 of the Periodic Table.

15. The composition which can be polymerized and/or crosslinked by dehydrocondensation for a battery electrolyte as claimed in claim 14, wherein the electrolyte salt (D) comprises a metal cation of lithium type.

16. The composition which can be polymerized and/or crosslinked by dehydrocondensation for a battery electrolyte as claimed in claim 15, wherein the amount of the electrolyte salt (D) is determined so that the O/Li molar ratio is between 15 and 40.

17. The composition which can be polymerized and/or crosslinked by dehydrocondensation for a battery electrolyte as claimed in claim 12, wherein the metal cation is chosen from transition metals.

18. The composition which can be polymerized and/or crosslinked by dehydrocondensation for a battery electrolyte as claimed in claim 17, wherein the metal cation is chosen from the group consisting of manganese, iron, cobalt, nickel, copper, zinc, calcium, manganese and silver.

19. The composition which can be polymerized and/or crosslinked by dehydrocondensation for a battery electrolyte as claimed in claim 1, wherein the electrolyte salt (D) is chosen from the group consisting of the following compounds:
$LiClO_4$, $LiBF_4$, $LiPF_6$, $LiAsF_6$, $LiCF_3SO_3$, $LiN(CF_3SO_2)_2$, $LiN(C_2F_5SO_2)_2$ and a mixture of these compounds.

20. The composition which can be polymerized and/or crosslinked by dehydrocondensation for a battery electrolyte as claimed in claim 1, wherein it comprises an organic electrolyte (E).

21. The composition which can be polymerized and/or crosslinked by dehydrocondensation for a battery electrolyte as claimed in claim 20, wherein the organic electrolyte (E) is chosen from the group consisting of the following compounds:
propylene carbonate, ethylene carbonate, diethyl carbonate, dimethyl carbonate, ethyl methyl carbonate, γ-butyrolactone, 1,3-dioxolane, dimethoxyethane, tetrahydrofuan, dimethyl sulfoxide and polyethylene glycol dimethyl ether.

22. A polymer electrolyte for a battery obtained by polymerization and/or crosslinking by the dehydrocondensation route, which dehydrocondensation is optionally thermally activated, of a polymerizable and/or crosslinkable composition as claimed in claim 1.

23. A polymer battery comprising a polymer electrolyte as claimed in claim 22 positioned between an anode and a cathode.

24. The polymer battery as claimed in claim 22, at least one of the constituents of the cathode is chosen from the group consisting of the following compounds:
lithium metal, lithium alloys, inorganic materials comprising lithium insertions and carbonate materials comprising lithium insertions.

* * * * *